United States Patent
Yeung

(10) Patent No.: US 9,566,822 B2
(45) Date of Patent: Feb. 14, 2017

(54) ELECTROSTATIC WALL STICKER, USE THEREOF, PROCESS FOR MANUFACTURING THE SAME, AND METHOD FOR STORING AND TRANSPORTING THE SAME

(71) Applicant: Morning Light Enterprises Co, Kowloon (HK)

(72) Inventor: Wing Shut Yeung, Kowloon (HK)

(73) Assignee: MORNING LIGHT ENTERPRISES CO, Kowloon (HK)

( * ) Notice: Subject to any disclaimer, the term of this patent is extended or adjusted under 35 U.S.C. 154(b) by 148 days.

(21) Appl. No.: 14/453,525

(22) Filed: Aug. 6, 2014

(65) Prior Publication Data

US 2015/0266336 A1    Sep. 24, 2015

(30) Foreign Application Priority Data

Mar. 18, 2014    (CN) .......................... 2014 1 0100677

(51) Int. Cl.
| | | |
|---|---|---|
| *B44C 5/04* | (2006.01) | |
| *B65B 25/14* | (2006.01) | |
| *B44C 1/10* | (2006.01) | |
| *D21H 27/20* | (2006.01) | |

(52) U.S. Cl.
CPC ............... *B44C 5/0461* (2013.01); *B44C 1/10* (2013.01); *B65B 25/146* (2013.01); *D21H 5/0082* (2013.01); *Y10T 428/24215* (2015.01)

(58) Field of Classification Search
CPC ..................................................... B65B 25/146
USPC .......................................................... 428/124
See application file for complete search history.

(56) References Cited

U.S. PATENT DOCUMENTS 7,422,648 B1 *    9/2008    Kassab .................. G09F 3/203
                                                       156/267

\* cited by examiner

*Primary Examiner* — Brent O'Hern
(74) *Attorney, Agent, or Firm* — Muncy, Geissler, Olds & Lowe, P.C.

(57) ABSTRACT

An electrostatic wall sticker, use thereof, process for manufacturing the same, and method for storing and transporting the same are disclosed. The electrostatic wall sticker comprises the sticker body comprising a using layer made of plastic film which comprises a first side and a second side, and an adhesive layer made of plastic film which comprises a first side and a second side. It can effectively replace traditional wall stickers. This invention has the advantages of securely mounting on any dry surface without the need of adhesive agents, leaving no mark upon removal and being highly environmentally friendly. Also, this electrostatic wall sticker possesses the properties of face-to-face and rolling storage of static electricity, which makes transportation convenient.

20 Claims, 4 Drawing Sheets

Figure 1:
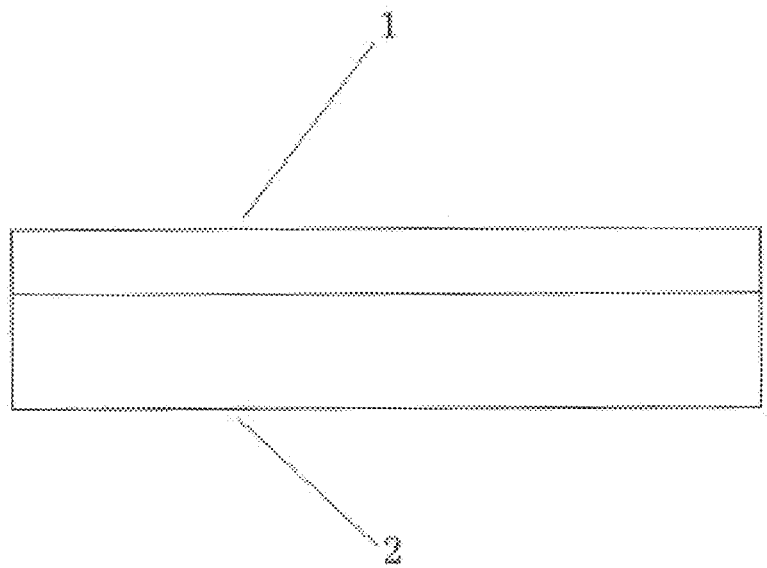

ELECTROSTATIC WALL STICKER, USE THEREOF, PROCESS FOR MANUFACTURING THE SAME, AND METHOD FOR STORING AND TRANSPORTING THE SAME

TECHNICAL FIELD OF THE INVENTION

The instant invention relates to the field of wall sticker, and more particularly, to an electrostatic wall sticker, use and manufacturing method thereof, and storage and transportation method of the wall sticker.

BACKGROUND OF THE INVENTION

Traditional wall stickers have the following disadvantages:
1. Glue or other adhesive agents are usually used on the adhesive layers. Although can be securely affixed, the stickers may come off easily over a period of time due to lower durability of the adhesive effects. Meanwhile, the stickers can easily leave stains or residual on the walls, which makes cleaning more difficult. Some of the adhesive agents are also toxic, which can cause harm to the human body.
2. In order to improve, some people have invented a type of electrostatic stickers that applies the electrostatic principle and adheres on smooth surfaces without using glue. However, due to the limited size of the stickers, the range of use was narrowly confined in usage such as stickers of car logos or cellphone screen protectors, which was difficult to meet the demands of the public, especially in the areas of office meeting and teaching, where there is no precedent of instant, convenient, and non-toxic electrostatic wall stickers for writing purposes.
3. Through adopting the electrostatic principles in affixing onto smooth surfaces, the existing electrostatic stickers do not require any glue or adhesive agent on their adhesive layers. Since these stickers do not leave any trace upon removal, they are mostly used in making small stickers for annual car inspection, environmentally-friendly logos, and cell phone screen protectors. As these electrostatic stickers are small in size, the complexity and costs of production processes are higher.
4. The electrostatic stickers can overcome the disadvantages of traditional wall stickers. However, as all electrostatic stickers require a protective layer to protect the static electricity on their surfaces, complexity for their methods of storing and transporting increased with mass production. In case such static stickers were not protected by protective layers, the static electricity stored could soon be lost, along with their adhesive function. Hence, whenever an electrostatic sticker is produced, an additional sheet of protective sticker would also need to be made, which would lead to wastage of resources and raised manufacturing costs.

SUMMARY OF INVENTION

To solve the above problems, this invention provides an electrostatic wall sticker.
This invention further provides use for the electrostatic wall sticker, which is particularly suitable for use in office and teaching domains.
This invention further provides the manufacturing method for the electrostatic wall sticker.

Further, this invention aims to provide a method of storing and transporting for the electrostatic wall stickers. To fulfill the aforementioned purposes, the first technical solution adopted by this invention is as follows: an electrostatic wall sticker, which comprises of the sticker body, the recited body of the electrostatic wall sticker comprises a using layer and an adhesive layer. The recited using layer and adhesive layer are made of plastic film. The second side of the recited using layer overlaps with the first side of the recited adhesive layer, while the first side of the recited using layer has invisible printing patterns or without patterns, the second side of the recited adhesive layer is covered with ions. The electrostatic wall sticker can be folded into two halves, in which the second side of the adhesive layer is inwardly arranged to overlap each other, while the first side of the using layer is outwardly arranged. The recited adhesive layer, while maintaining its adhesiveness and can be affixed on any smooth surfaces (e.g. fabrics, walls, glass) without glue, can be used repeatedly even after multiple removals. The sticker does not leave any marks on the surface and are highly environmentally friendly. When not in use, the electrostatic wall sticker can be stored by folding into halves. After folded into halves, the ions on the adhesive layer will not be lost easily and can be kept for at least 1 year. Such storage method can save the protective layers that are traditionally used for protecting electrostatic surfaces, thereby staying environmentally friendly and reducing the production cost.

Preferably, for mass production, easy packaging and storage and transportation, the electrostatic wall stickers are curly shaped, which can be rolled around cardboard tubes with the second side of the adhesive layer inwardly arranged and the first side of the using layer outwardly arranged.

Preferably, for easy write-on and wipe-off on the using layer, the first side of the recited using surface has an easy-to-erase oil-based film.

Preferably, the plastic film is made of PET film, PVC film, YUPO film, PP film, PC film, or PE film.

Preferably, material of the recited adhesive layer has a thickness of 0.02 mm-0.5 mm.

The second technical solution adopted by this invention is:

Use of an electrostatic wall sticker, with the recited electrostatic wall sticker comprises the using layer and adhesive layer. The areas of use for the recited electrostatic wall sticker include the beautification of daily living, office environments, and teaching situations.

Preferably, the main use of the use in beautifying daily living environments includes using the sticker as poster stickers, decoration stickers, ornamental wall stickers, and photo papers. In both office environments and teaching situations, the electrostatic wall sticker mainly replaces traditional writing boards and blackboards by directly affixing on any flat surface or the walls for writing purposes. This electrostatic wall sticker can also be used as photo papers. The preferred patterns can be printed through printers or as photo papers for Polaroid cameras. Photos printed through Polaroid cameras can be affixed on walls or glass as desired.

Preferably, when the recited electrostatic wall stickers are used in office or teaching situations, the writing marks on these stickers can be removed directly and made the stickers ready for repeated use.

The third technical solution adopted by this invention is:

The process for manufacturing the electrostatic wall sticker, the electrostatic wall sticker comprising a using layer and an adhesive layer, wherein the process comprises the following steps:

a. selecting raw materials for manufacturing the using layer and adhesive layer of the electrostatic wall sticker, which material is selected form the group consisting of PET film, PVC film, YUPO film, PP film, PC films or PE film;
b. cutting the material selected in Step a into required specifications by a cutting machine;
c. compositing the raw materials cut by Step b with a compositing installation;
d. injecting static electricity onto the voltage onto the reverse side of the plastic sheet in Step c to create an adhesive layer that carries static electricity by using an anti-DC ion generator, and
e. using a paper-reeling machine to roll up the electrostatic wall sticker in order to enable packaging.

Preferably, the voltage of the ion generator in Step d is set at 3000-3500 volts.

Preferably, when the electrostatic wall stickers pass through the paper-reeling machine in Step c, the second side of the adhesive layer is inwardly arranged to overlap each other, while the first side of the using layer is outwardly arranged. And more preferably, the second side of the adhesive layer is inwardly arranged to overlap each other, while the first side of the using layer is outwardly arranged when the electrostatic wall sticker goes through the paper-reeling machine.

The fourth technical solution adopted by this invention is:

A transportation method of the electrostatic wall sticker according to this invention, in which the electrostatic wall sticker comprises a using layer and an adhesive layer made of plastic film, wherein the method comprises storing and transporting the electrostatic wall sticker in rolls on a cardboard tube by using a paper-reeling machine, with the adhesive layer being inwardly arranged while the using layer being outwardly arranged.

Preferably, the method further comprises face-to-face storing and transporting, in which the electrostatic wall stickers are folded into halves, the second side of the adhesive layer is inwardly arranged to overlap each other, while the first side of the using layer is outwardly arranged, or the second side of the adhesive layer of two sheets of the electrostatic wall stickers are overlapped each other. By using this storage method, the ions on the using layer will not be lost easily and can be kept for at least 1 year.

The present invention may bring about many beneficial effects in this field, for example:
1. The electrostatic wall sticker of the invention can be able to effectively replace traditional wall stickers by giving strong adhesive results on any dry surface without the use of adhesive agents, leaving no marks on the surface after removal, which can maintain the cleanliness while beautifying the environment;
2. The electrostatic wall sticker of the invention can be able to be printed or written on, which enhances its functionality;
3. Manufacturing of additional protective sticker is not required during the production of this product, which reduces the production costs;
4. This electrostatic wall sticker possessing the properties of face-to-face and rolling storage of static electricity, which makes transportation convenient. When not in use, the stickers can be removed from the surface and folded into halves for face-to-face adhesion during storage. By simply unfolding the sticker, the saved static electricity can adhere to the surfaces and support instant use in the future, while prolonging the usage life to the greatest extent possible, the stickers are also easy to store.
5. This electrostatic wall sticker can be widely used in many domains. Apart from the commonly used car logo stickers and cellphone screen protectors, it can also be used for beautifying daily living, such as posters and ornamental purposes. Likewise, they may also be used in offices or classrooms to replace traditional writing boards and classroom blackboards. Users may write directly on the electrostatic wall stickers and erase afterwards.

BRIEF DESCRIPTIONS OF THE DRAWINGS

Figure 2:
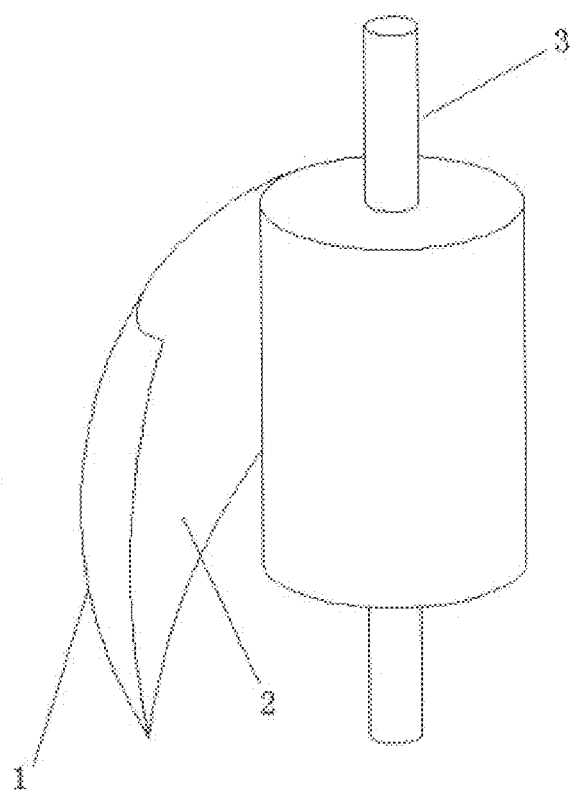
Figure 3:
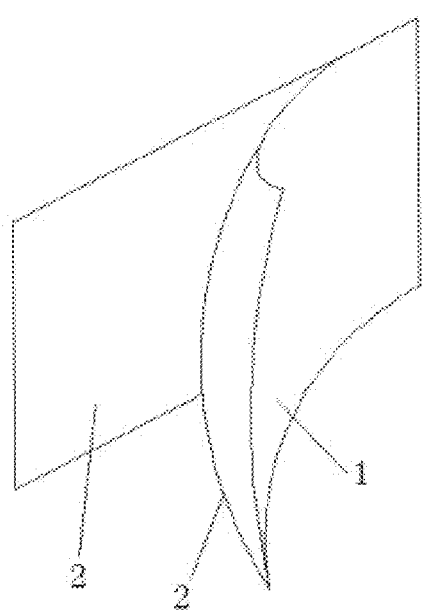
Figure 4:
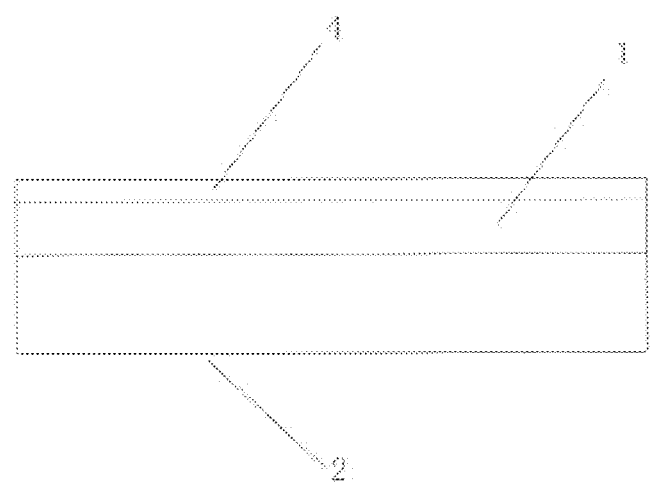

FIG. 1 is the side sectional view of this invention;
FIG. 2 is the sketch map of the roll-up storing and transporting methods for this invention;
FIG. 3 is the sketch map of the face-to-face storing method for this invention; and
FIG. 4 is the side sectional view of the using layer with oil-based film in this invention; in which, reference signs are:
1. Using layer; 2. Adhesive layer; 3. Cardboard tube; 4. Oil-based film.

DETAILED DESCRIPTION OF THE INVENTION

Referring to FIGS. 1-3, this invention relates to an electrostatic wall stickers, process of manufacturing the same, and method of storing the static electricity. Detailed description of the invention are set forth in the following in order to enable the skilled in the art to carry out this invention.

Example One

An electrostatic wall sticker is comprised of a sticker body. The body of the electrostatic wall sticker comprises a using layer and an adhesive layer. The using layer and adhesive layer are made of plastic films. The second side of the using layer directly overlaps with the first side of the recited adhesive layer, while the first side of the recited using layer has invisible printing patterns or without patterns, and the second side of the recited adhesive layer is covered with ions. The electrostatic wall sticker can be folded into two halves, in which the second side of the adhesive layer is inwardly arranged to overlap each other, while the first side of the using layer is outwardly arranged. The adhesive layer, while maintaining its adhesiveness and can be affixed on any smooth surfaces (e.g. fabrics, walls, glass) without glue, can be used repeatedly even after multiple removals. The stickers do not leave any marks on the surface and are highly environmentally-friendly. When not in use, the electrostatic wall stickers can be stored by folding into halves. After folded into halves, the ions on the adhesive layer will not be lost easily and can be kept for at least 1 year. Such a storage method can save the protective layers that are traditionally used for protecting electrostatic surfaces, thereby staying environmentally-friendly and reducing the production costs.

Preferably, for mass production, easy packaging and storage and transportation, the electrostatic wall stickers are curly shaped, which can be rolled around cardboard tubes with the second side of the adhesive layer inwardly arranged and the first side of the using layer outwardly arranged.

Preferably, for easy write-on and wipe-off on the using layer, the first side of the recited using surface has an easy-to-erase oil-based film.

Preferably, the recited plastic films are made of PET films, PVC films, YUPO films, PP films, PC films, or PE films.

Preferably, material of the recited adhesive layer has a thickness of 0.02 mm-0.5 mm.

Example Two

Use of an electrostatic wall sticker, with the areas of use for the recited electrostatic wall sticker including the beautification of daily living, office environments, and teaching situations.

Preferably, the main use of the beautifying daily living environments includes using as poster stickers, decoration stickers, ornamental wall stickers, and photo papers. In both office environments and teaching situations, the recited electrostatic wall sticker mainly replaces traditional writing boards and blackboards by directly affixing on any flat surface or the walls for writing purposes.

Preferably, when the recited electrostatic wall stickers are used in office or teaching situations, the writing marks on these stickers can be removed directly and made the stickers ready for repeated use.

When using these electrostatic wall stickers, users may print or write on the using layer according to different needs. For instance, patterns of personal preferences may be printed on the using layer of those ornamental wall stickers meant for home decoration. The wall stickers may also be firmly affixed on the wall as needed and without using glue. Apart from achieving the goal of home decoration, such stickers are also easy to remove and be changed. Likewise, when used in office or teaching situations, users may simply cut out the desired size and affix these electrostatic wall stickers on the walls for writing purposes. Since the use surface is made of plastic materials like PET film, PVC film, YUPO film, PP film, PC film, or PE film, the writing can easily be erased. These electrostatic wall stickers can also be used as photo papers. The preferred patterns can be printed through printers or as photo papers for Polaroid cameras. Photos printed through Polaroid cameras can be affixed on walls or glass as desired.

Example Three

A process for manufacturing the electrostatic wall sticker, in which the electrostatic wall sticker comprises the using layer (1) and adhesive layer (2). The process comprised the following steps:
a. selecting raw materials for manufacturing the using layer and adhesive layer of the electrostatic wall sticker, which material is selected form the group consisting of PET film, PVC film, YUPO film, PP film, PC films or PE film;
b. cutting the material selected in Step a into required specifications by a cutting machine;
c. compositing the raw materials cut by Step b with a compositing installation;
d. injecting static electricity onto the voltage onto the reverse side of the plastic sheet in Step c to create an adhesive layer that carries static electricity by using an anti-DC ion generator.
e. using a paper-reeling machine to roll up the electrostatic wall sticker in order to enable packaging.

Preferably, the voltage of the ion generator in Step d was set at 3000-3500 volts.

The process further comprises the step of using a paper-reeling machine to roll up the electrostatic wall sticker in order to enable packaging. Preferably, when the electrostatic wall stickers pass through the paper-reeling machine, the second side of the adhesive layer (2) is inwardly arranged to overlap each other, while the first side of the using layer (1) is outwardly arranged.

Example Four

A method for storing and transporting for the electrostatic wall sticker, which comprises:
A. Storage and transportation in rolls—by using a paper-reeling machine, the electrostatic wall sticker is rolled on a cardboard tube (3), the adhesive layer (2) is inwardly arranged while the using layer (1) is outwardly arranged, as shown in FIG. 2;
B. Face-to-face storage and transportation—the recited electrostatic wall stickers are folded into halves, the second side of the adhesive layer (2) is inwardly arranged to overlap each other, while the first side of the using layer (1) is outwardly arranged, as shown in FIG. 3, or with the second side of the adhesive layer of two sheets of the electrostatic wall stickers overlapping each other. By using this storage method, the ions on the using layer will not be lost easily and can be kept for at least 1 year.

The present invention may bring about many beneficial effects in this field, for example:
1. The electrostatic wall sticker of the invention can be able to effectively replace traditional wall stickers by giving strong adhesive results on any dry surface without the use of adhesive agents, leaving no marks on the surface after removal, which can maintain the cleanliness while beautifying the environment;
2. The electrostatic wall sticker of the invention can be able to be printed or written on, which enhances its functionality;
3. Manufacturing of additional protective sticker is not required during the production of this product, which reduces the production costs;
4. This electrostatic wall sticker possessing the properties of face-to-face and rolling storage of static electricity, which makes transportation convenient. When not in use, the stickers can be removed from the surface and folded into halves for face-to-face adhesion during storage. By simply unfolding the sticker, the saved static electricity can adhere to the surfaces and support instant use in the future, while prolonging the usage life to the greatest extent possible, the stickers are also easy to store.
5. This electrostatic wall sticker can be widely used in many domains. Apart from the commonly used car logo stickers and cellphone screen protectors, it can also be used for beautifying daily living, such as posters and ornamental purposes. Likewise, they may also be used in offices or classrooms to replace traditional writing boards and classroom blackboards. Users may write directly on the electrostatic wall stickers and erase afterwards.

The aforementioned implementation methods are merely the descriptions on the preferred implementation methods and have not set out restrictions on the scopes of this invention. In the principle of not deviating from the spirit of design for this invention, all the modifications and improvements made by the skilled in the art must be protected by appended claims for this invention.

What is claimed is:

1. An electrostatic wall sticker comprising a sticker body which comprises:
   a using layer made of plastic film, which comprises a first side and a second side;
   an adhesive layer made of plastic film, which comprises a first side and a second side;

the second side of the using layer directly overlaps and covers the first side of the adhesive layer; and a plurality of electric ion evenly disposed on the second side of the adhesive layer;

wherein the electrostatic wall sticker being such arranged that the electrostatic wall sticker is folded into two halves, in which the second side of the adhesive layer is inwardly arranged to overlap each other, while the first side of the using layer is outwardly arranged.

2. The electrostatic wall sticker according to claim 1, wherein the electrostatic wall sticker is curly shaped, and the second side of the adhesive layer is inwardly arranged to overlap each other, while the first side of the using layer is outwardly arranged.

3. The electrostatic wall sticker according to claim 1, wherein the first side of the using layer is printed with invisible patterns.

4. The electrostatic wall sticker according to claim 1, wherein the first side of the using layer has an easy-to-clean oil-based film.

5. The electrostatic wall sticker according to claim 1, wherein the plastic film of the using layer is made of a polyester film, a polyvinyl chloride film, a yupo film, a polypropylene film, a polycarbonate film, and/or a polyethylene film.

6. The electrostatic wall sticker according to claim 1, wherein the adhesive layer has a thickness of 0.02 mm-0.5 mm.

7. The electrostatic wall sticker according to claim 1, wherein the first side of the using layer has a writeable and erasable surface.

8. The electrostatic wall sticker according to claim 1, wherein the electrostatic wall sticker is in form of an esthetic and decorative article, including a poster, a decoration sticker, an ornamental wall sticker, and a photo paper.

9. The electrostatic wall sticker according to claim 7, wherein the electrostatic wall sticker is configured as an erasable and rewritable writing board by affixing to a flat surface for writing purpose.

10. The electrostatic wall sticker according to claim 7, wherein the electrostatic wall sticker is configured as an erasable and rewritable blackboard by affixing to a wall for writing purposes.

11. An electrostatic wall sticker comprising a sticker body which comprises:

a using layer made of plastic film, which comprises a first side and a second side;

an adhesive layer made of plastic film, which comprises a first side and a second side;

the second side of the using layer being overlapped and covered on the first side of the adhesive layer; and a plurality of electric ion evenly disposed on the second side of the adhesive layer;

wherein the electrostatic wall sticker being such arranged that the electrostatic wall sticker is folded into two halves, in which the second side of the adhesive layer is inwardly arranged to overlap each other, while the first side of the using layer is outwardly arranged;

wherein the first side of the using layer has a writeable and erasable surface; and the electrostatic wall sticker is configured as an erasable and rewritable writing board by affixing to a flat surface for writing purpose.

12. The electrostatic wall sticker according to claim 11, wherein the electrostatic wall sticker is curly shaped, and the second side of the adhesive layer is inwardly arranged to overlap each other, while the first side of the using layer is outwardly arranged.

13. The electrostatic wall sticker according to claim 11, wherein the first side of the using layer is printed with invisible patterns.

14. The electrostatic wall sticker according to claim 11, wherein the first side of the using layer has an easy-to-clean oil-based film.

15. The electrostatic wall sticker according to claim 11, wherein the plastic film of the using layer is made of a polyester film, a polyvinyl chloride film, a yupo film, a polypropylene film, a polycarbonate film, and/or a polyethylene film.

16. The electrostatic wall sticker according to claim 11, wherein the adhesive layer has a thickness of 0.02 mm-0.5 mm.

17. The electrostatic wall sticker according to claim 11, wherein the electrostatic wall sticker is in form of an esthetic and decorative article, including a poster, a decoration sticker, an ornamental wall sticker, and a photo paper.

18. An electrostatic wall sticker comprising a sticker body which comprises:

a using layer made of plastic film, which comprises a first side and a second side;

an adhesive layer made of plastic film, which comprises a first side and a second side;

the second side of the using layer being overlapped and covered on the first side of the adhesive layer; and a plurality of electric ion evenly disposed on the second side of the adhesive layer;

wherein the electrostatic wall sticker being such arranged that the electrostatic wall sticker is folded into two halves, in which the second side of the adhesive layer is inwardly arranged to overlap each other, while the first side of the using layer is outwardly arranged;

wherein the first side of the using layer has a writeable and erasable surface; and the electrostatic wall sticker is configured as an erasable and rewritable blackboard by affixing to a wall for writing purposes.

19. The electrostatic wall sticker according to claim 18, wherein the electrostatic wall sticker is curly shaped, and the second side of the adhesive layer is inwardly arranged to overlap each other, while the first side of the using layer is outwardly arranged.

20. The electrostatic wall sticker according to claim 18, wherein the first side of the using layer has an easy-to-clean oil-based film; and/or the first side of the using layer is printed with invisible patterns; and/or the plastic film of the using layer is made of a polyester film, a polyvinyl chloride film, a yupo film, a polypropylene film, a polycarbonate film, and/or a polyethylene film; and/or the adhesive layer has a thickness of 0.02 mm-0.5 mm; and/or the electrostatic wall sticker is in form of an esthetic and decorative article, including a poster, a decoration sticker, an ornamental wall sticker, and a photo paper.

* * * * *